US012683399B2

(12) United States Patent
Brissette et al.

(10) Patent No.: US 12,683,399 B2
(45) Date of Patent: Jul. 14, 2026

(54) SYSTEM AND METHODS FOR MANAGING THE LOAD PROFILE OF A LOW TO MEDIUM VOLTAGE ELECTRIC NETWORK INCLUDING AN ENERGY STORAGE SYSTEM

(71) Applicant: ABB Schweiz AG, Baden (CH)

(72) Inventors: Alexander Brissette, Raleigh, NC (US); Fabio D'Agostino, Genoa (IT); Matteo Saviozzi, Albisola Superiore (IT)

(73) Assignee: ABB Schweiz AG, Baden (CH)

( * ) Notice: Subject to any disclaimer, the term of this patent is extended or adjusted under 35 U.S.C. 154(b) by 600 days.

(21) Appl. No.: 18/301,009

(22) Filed: Apr. 14, 2023

(65) Prior Publication Data

US 2024/0348052 A1 Oct. 17, 2024

(51) Int. Cl.
  *H02J 3/14* (2026.01)
  *H02J 105/50* (2026.01)
  *H02J 105/52* (2026.01)

(52) U.S. Cl.
  CPC ............. *H02J 3/14* (2013.01); *H02J 2105/52* (2026.01); *H02J 2105/57* (2026.01)

(58) Field of Classification Search
  CPC ........ H02J 3/003; H02J 7/0013; H02J 7/0048; H02J 13/00002; H02J 3/14; H02J 3/144; G05B 13/048; G05B 2219/2639; G05B 2219/2642
  See application file for complete search history.

(56) References Cited

U.S. PATENT DOCUMENTS

| | | | | |
|---|---|---|---|---|
| 9,365,121 | B2 * | 6/2016 | Kim ...................... | B60L 3/0046 |
| 9,787,095 | B2 * | 10/2017 | Ragaini ..................... | H02J 3/17 |
| 2015/0028671 | A1 | 1/2015 | Ragaini et al. | |
| 2016/0190833 | A1 * | 6/2016 | Roumi ..................... | H02J 7/00 |
| | | | | 320/136 |
| 2017/0338665 | A1 * | 11/2017 | Long ..................... | H02J 7/0013 |
| 2020/0370773 | A1 * | 11/2020 | Li ........................ | G05B 13/048 |

(Continued)

FOREIGN PATENT DOCUMENTS

| | | | |
|---|---|---|---|
| BR | 112014022567-2 | B1 | 9/2020 |
| CN | 104221240 | A | 12/2014 |

(Continued)

*Primary Examiner* — Darrin D Dunn
(74) *Attorney, Agent, or Firm* — Fitch Even Tabin & Flannery LLP

(57) ABSTRACT

A system for managing the load profile of an electric network is provided. The system includes: a plurality of loads, and each respective load of the plurality of loads is assigned a priority, an energy storage system, and a controller. The controller is configured to determine a predicted energy usage of the electric network at an end of a time period, based on comparing the predicted energy usage to a target energy usage, determine an adjustment of the plurality of loads based on the respective priority of each respective load. Based on the adjustment of the plurality of loads and a charge of the energy storage system, the controller dynamically assigns a priority to the energy storage system, and performs the adjustment of the plurality of loads and the energy storage system using the respective priority of each respective load and the dynamically assigned priority of the energy storage system.

18 Claims, 6 Drawing Sheets

(56)                     References Cited

U.S. PATENT DOCUMENTS

| | | | |
|---|---|---|---|
| 2022/0224129 A1* | 7/2022 | Liu | H01M 10/425 |
| 2023/0119821 A1* | 4/2023 | Sharma | H02J 7/0013 |
| | | | 320/124 |
| 2023/0139514 A1* | 5/2023 | Tennant | H02J 3/003 |
| | | | 700/291 |
| 2024/0266831 A1* | 8/2024 | Rajaraman | H02J 3/144 |
| 2024/0275200 A1* | 8/2024 | Kim | H02J 7/007182 |
| 2024/0286515 A1* | 8/2024 | Tumpach | B60L 53/64 |

FOREIGN PATENT DOCUMENTS

| | | | |
|---|---|---|---|
| CN | 110138091 A | 8/2019 |
| EP | 2826120 A1 | 1/2015 |
| RU | 2014141500 A | 5/2016 |
| RU | 2609665 C2 | 2/2017 |
| WO | WO 2013/135296 A1 | 9/2013 |

* cited by examiner

300

| Device | Priority (r) | Steps (s) |
|--------|--------------|-----------|
| BESS 1 | Dynamic | 8 |
| BESS 2 | Dynamic | 8 |
| Load 1 | 5 | 1 (on/off) |
| Load 2 | 2 | 4 (driver) |
| Load 3 | 6 | 1 (on/off) |
| Load 4 | 2 | 4 (driver) |
| Load 5 | 6 | 1 (on/off) |
| Load 6 | 10 | 4 (driver) |
| Load 7 | 7 | 1 (on/off) |
| Load 8 | 8 | 4 (driver) |
| Load 9 | 9 | 1 (on/off) |
| Load 10 | 9 | 4 (driver) |

350

| 352 | $\Delta P_{request} > 0$ (discharge) | | $\Delta P_{request} < 0$ (charge) | |
|---|---|---|---|---|
| SOC | $BESS1^r$ | $BESS2^r$ | $BESS1^r$ | $BESS2^r$ |
| 0-10% | 10 | 10 | 10 | 10 |
| 10-20% | 10 | 10 | 9 | 9 |
| 20-30% | 8 | 8 | 8 | 8 |
| 30-40% | 6 | 6 | 7 | 7 |
| 40-50% | 4 | 4 | 6 | 6 |
| 50-60% | 2 | 2 | 5 | 5 |
| 60-70% | 1 | 2 | 2 | 2 |
| 70-80% | 1 | 2 | 1 | 2 |
| 80-90% | 1 | 2 | 1 | 2 |
| 90-100% | 1 | 2 | 1 | 2 |

500

Determine a predicted energy usage of the electric network at an end of a time period ⎯502

Based on comparing the predicted energy usage to a target energy usage, determine an adjustment of the plurality of loads based on the respective priority of each respective load ⎯504

Based on the determined adjustment of the plurality of loads and a determined state of charge of the energy storage system, dynamically assign a priority to the energy storage system ⎯506

Perform the adjustment of the plurality of loads and the energy storage system of the electric network using the respective priority of each respective load and the dynamically assigned priority of the energy storage system ⎯508

FIG. 5

SYSTEM AND METHODS FOR MANAGING THE LOAD PROFILE OF A LOW TO MEDIUM VOLTAGE ELECTRIC NETWORK INCLUDING AN ENERGY STORAGE SYSTEM

FIELD

The present disclosure relates to a method and system for managing a load profile of a low to medium voltage electrical network. In particular, the present disclosure relates to electric power distribution networks for industrial, commercial, and residential facilities or plants.

BACKGROUND

An industrial, commercial, or residential facility may need to regulate its net energy usage in order to: reduce energy costs, participate in active demand programs, or, reduce greenhouse gas emissions. To this end, many facilities install generation and storage resources to help manage their energy usage. However, developing a strategy for managing generation and storage resources can be complex, and require high-powered computations. There is a need for a method to manage generation and storage resources that is simple and does not require a high computational effort.

SUMMARY

A first aspect of the present disclosure provides a system for managing the load profile of a low to medium voltage electric network. The system comprises: a plurality of loads electrically coupled to the electric network, wherein each respective load of the plurality of loads is assigned a respective priority; an energy storage system electrically coupled to the electric network; and a controller configured to: determine a predicted energy usage of the electric network at an end of a time period; based on comparing the predicted energy usage to a target energy usage, determine an adjustment of the plurality of loads based on the respective priority of each respective load; based on the determined adjustment of the plurality of loads and a determined state of charge of the energy storage system, dynamically assign a priority to the energy storage system; and perform the adjustment of the plurality of loads and the energy storage system of the electric network using the respective priority of each respective load and the dynamically assigned priority of the energy storage system.

According to an implementation of the first aspect, dynamically assigning the priority to the energy storage system comprises: based on determining that the state of charge of the energy storage system is greater than a discharge threshold, assigning a first priority to the energy storage system.

According to an implementation of the first aspect, dynamically assigning the priority to the energy storage system further comprises: based on determining that the state of charge of the energy storage system is lower than a charge threshold, assigning a second priority to the energy storage system.

According to an implementation of the first aspect, the first priority is lower than the second priority.

According to an implementation of the first aspect, performing adjustment of the energy storage system comprises: providing instructions to the energy storage system to provide power to the electric network based on the assigned first priority.

According to an implementation of the first aspect, performing the adjustment of the energy storage system comprises: providing instructions to the energy storage system to receive power from the electric network based on the assigned second priority.

According to an implementation of the first aspect, performing the adjustment of the plurality of loads comprises: based on determining that the predicted energy usage is greater than the target energy usage within the time period, identifying a threshold priority level; and determining a subset of loads from the plurality of loads, wherein the respective priority associated with each respective load of the subset of loads is less than the threshold priority level; and providing instructions to each respective switching device associated with each respective load of the subset of loads to electrically decouple the respective load of the subset of loads from the electric network.

According to an implementation of the first aspect, performing the adjustment of the plurality of loads comprises: based on determining that the predicted energy usage is less than the target energy usage within the time period, identifying a threshold priority level; and determining a subset of loads from the plurality of loads, wherein the respective priority associated with each respective load in the subset of loads is greater than the threshold priority level; and providing instructions to each respective switching device associated with each respective load of the subset of loads to electrically couple the respective load of the subset of loads to the electric network.

According to an implementation of the first aspect, the predicted energy usage is determined periodically within the time period.

According to an implementation of the first aspect, the time period is a length of fifteen minutes.

A second aspect of the present disclosure provides a method for executing a transfer from a first power source to a second power source. The method comprises: determining a predicted energy usage of the electric network at an end of a time period, wherein the electric network comprises a plurality of loads electrically coupled to the electric network, and wherein each respective load of the plurality of loads is assigned a respective priority; based on comparing the predicted energy usage to a target energy usage, determining an adjustment of the plurality of loads based on the respective priority of each respective load; based on the determined adjustment of the plurality of loads and a determined state of charge of an energy storage system electrically coupled to the electric network, dynamically assigning a priority to the energy storage system; and performing the adjustment of the plurality of loads and the energy storage system of the electric network using the respective priority of each respective load and the dynamically assigned priority of the energy storage system.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 3A-3B depict different tables that are used for managing the load profile of the electric voltage network, according to one or more examples of the present disclosure;

FIG. 5 is a flow chart of an exemplary process for managing the load profile of the electric voltage network, according to one or more examples of the present disclosure.

DETAILED DESCRIPTION

Figure 1:
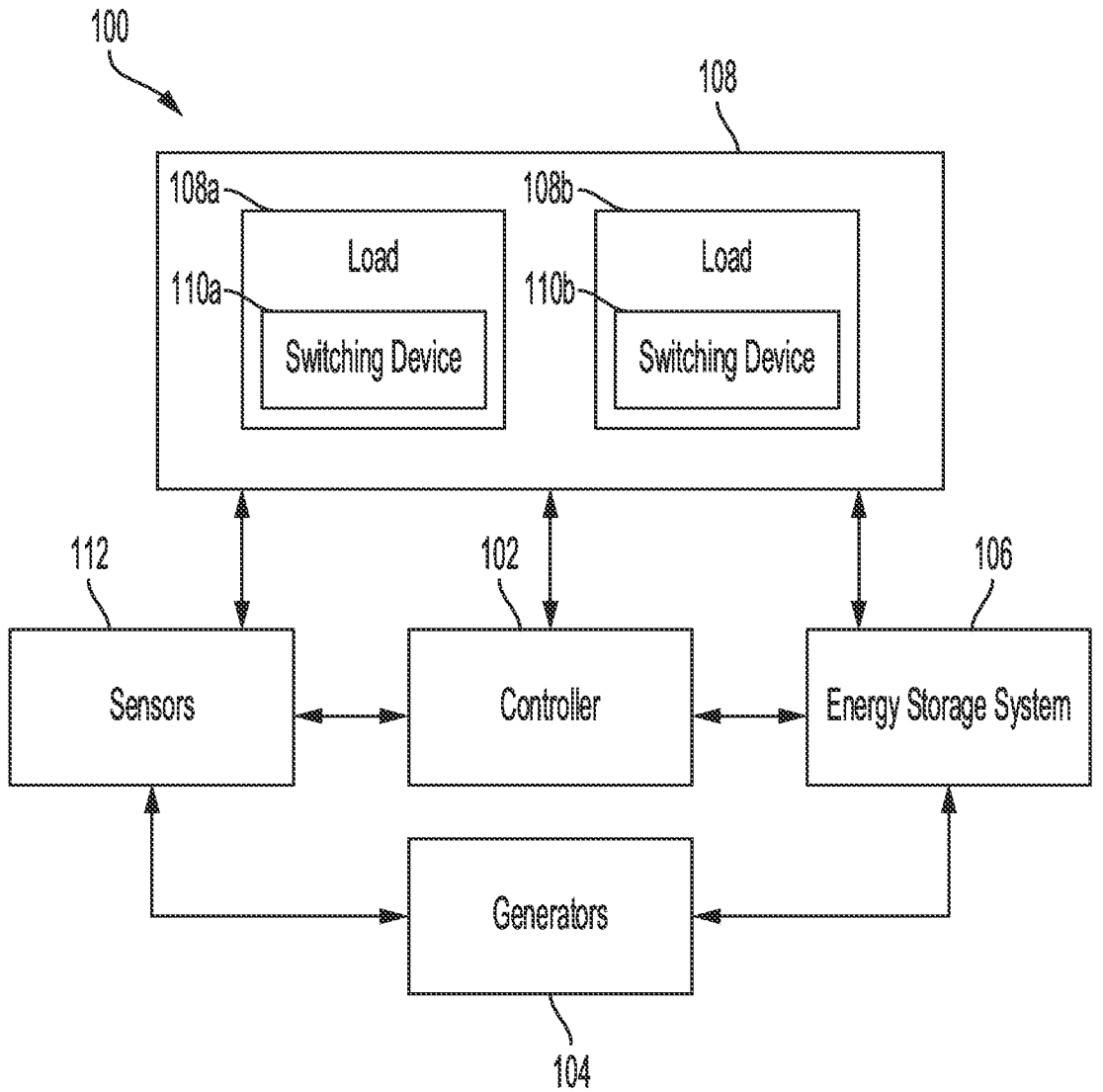
FIG. 1 illustrates a simplified block diagram depicting a system for managing a load profile of an electric voltage network, according to one or more examples of the present disclosure.

Electrical power distribution networks for industrial, commercial, and residential facilities may need to regulate their net energy usage. Exemplary reasons to regulate net energy usage may include, but are not limited to, reducing energy costs, participation in active demand programs, provision of flexibility energy/reserve, and reducing greenhouse gas emissions. In order to reduce electric power consumption, facilities install energy generation and storage resources to help monitor and manage their energy usage. However, existing strategies for managing generation and storage resources are complex and require high-powered computations.

This present disclosure provides a method to regulate energy usage of a low to medium voltage electrical network. In order to regulate energy usage of a low to medium voltage electrical network, a controller of the electrical network monitors the energy usage of the electric network over a first portion of a time window. The controller then uses the monitored data to generate a forecast of total energy usage for the electrical network for the remainder of the time window. In some embodiments, if the forecast total energy usage of the electrical network is set to exceed a target energy usage at the end of the time window, electricity generation in the electric network may be increased and/or the electrical load consumption of the electrical network may be reduced. On the other hand, if the forecast total energy usage of the electrical network is below the target energy usage, electricity generation in the electric network may be decreased and/or the electrical load consumption of the electrical network may be increased. At the end of the time window, the process of analyzing the power consumption is repeated in the succeeding iteration of the predetermined time window.

The network depicted by system 100 may be connected to an electric grid from which the network may draw power. The electric network may comprise a plurality of loads. For the sake of example, if we assume that the electrical network is a residential facility, the various loads may include, but may not be limited to an elevator system of the residential facility, a light system of the residential facility, an air-conditioning system of the residential facility.

The various loads may be organized by a priority rating. In some embodiments, the priority rating may be assigned externally by a user when the network is setup. Similarly, the various generators that are part of the electric voltage network may be organized by a priority rating and the priority rating may be assigned externally by a user when the network is setup. For example, an administrator of a facility may assign a priority to each load and generator of the system.

In some embodiments, an energy storage system may be used in the network in addition with loads and generators. The energy storage system, depending on a charge of the energy storage system, may act as a load and a generator. For example, if the energy storage system has low charge, the controller may charge the energy storage device and the energy storage device may act as a load. On the other hand, if the energy storage system is close to fully charged, the energy storage system may provide electricity to the network and act as a generator. In either case, the energy storage system may be assigned a different priority.

The addition of the energy storage system to the network improves energy usage of the network without requiring a high-performance computing solution.

FIG. 1 illustrates a simplified block diagram depicting a system for managing a load profile of an electric voltage network, according to one or more examples of the present disclosure. System 100 of FIG. 1 includes a plurality of loads 108 connected to the electric voltage network. The electric voltage network maybe connected to an electric grid from where the electric voltage network depicted by system 100 may draw power. In some embodiments, system 100 may also include generators 104 that may reduce the power that the electric voltage network depicted by system 100 draws from the electric grid. The amount of power generated by the generators 104 may be controlled by controller 102.

For exemplary purposes, the plurality of loads 108 are depicted to include a first load 108a and a second load 108b. In some embodiments, there may be more than two loads 108a and 108b that are part of the plurality of loads 108. Each of the plurality of loads 108a and 108b are assigned a priority. In some embodiments, the priority may be assigned by an administrator of the system 100.

In some embodiments, the assigned priority may be stored along with information corresponding to the loads 108a and 108b in a memory associated with controller 102 of the system 100. For example, a person responsible for the electric voltage network depicted by system 100 may assign priorities to the plurality of loads 108 based on an importance of the loads. In case system 100 is applied in a residential facility, electric systems such as elevators, and ventilation systems may be given a higher priority while electric systems such as lighting in the parking lot may be given lower priority.

Each of the loads 108a and 108b has a respective switching device 110a and 110b. Switching devices 110a and 110b may be used to connect or disconnect loads 108a and 108b to and from the network 100. Switching devices 110a and 110b may be controlled by a controller 102. The controller 102 may determine a power consumed by each of the plurality of loads 108 using sensors 112 connected to the plurality of loads. For example, the sensors 112 may include current sensors and voltage sensors (not depicted in FIG. 1) that may be used to measure the current and voltage associated with each load 108a and 108b. The sensors 112 may communicate the measured current and voltage to the controller 102. The controller 102 may analyze the measured current and voltages to calculate the power consumed by each load of the plurality of loads 108 in a first part of the predetermined period. Using the analyzed current and voltages, the controller 102 may also generate a forecast of the power consumed by each of the plurality of loads 108 at the end of a predetermined time period. The predetermined time period may be a discrete window of time of 5 minutes, 10 minutes, 15 minutes, 20 minutes, or any other discrete window of time. The controller 102 may compare the generated forecast of power consumption to a threshold range of desirable power consumption within the remainder of the predetermined time period. The threshold range of desirable power consumption may include an upper threshold of maximum desirable power consumption and a lower threshold of minimum desirable power consumption. At the end of the predetermined time period, the controller 102 may repeat the analysis of the current and voltages of the plurality of loads 108 for a successive predetermined time period.

In some embodiments, if the forecast power consumption is greater than the upper threshold of desirable power consumption, the controller 102 may find ways to reduce power consumption or disconnect some of the plurality of loads 108. In order to reduce power consumption of the electric voltage network depicted by system 100, the controller 102 may also increase power generation by instructing generators 104 to increase power generation so that system 100 draws lesser power from the electric grid to which the system 100 may be connected.

In some other embodiments, if the forecast power consumption is less than the lower threshold of desirable power consumption, the controller 102 may connect some of the plurality of loads 108. In order to reduce power consumption of the electric voltage network depicted by system 100, the controller 102 may also decrease power generation by instructing generators 104 to decrease power generation so that system 100 draws more power from the larger electric network to which the system 100 may be connected.

Energy storage system 106 of system 100 is connected to the electric voltage network. Depending on the charge of the energy storage system 106, the energy storage system 106 may act as a load of the plurality of loads 108, or a generator of generators 104. A state of charge of the energy storage system 106 is periodically communicated to controller 102. In some embodiments, if the controller 102 determines that the state of charge of the energy storage system 106 is greater than a charge threshold, the controller 102 may classify the energy storage system 106 as a generator of the generators 104 to reduce the load of system 100 and may assign a discharge priority to the energy storage system 106. In some embodiments, if the controller 102 determines that the state of charge of the energy storage system 106 is lower than a discharge threshold, the controller 102 may classify the energy storage system 106 as a load of the plurality of loads 108 to increase the load of system 100 and may assign a charge priority to the energy storage system 106. Thus, the priority assigned to the energy storage system 106 may change based on the state of charge of the energy storage system 106. For example, when the energy storage system 106 has a state of charge above the charge threshold, a first priority may be assigned to the energy storage system 106 by controller 102. Similarly, when the energy storage system 106 has a state of charge below the discharge threshold, a second priority may be assigned to the energy storage system 106 by the controller 102, as is shown in more detail in FIG. 3B.

Figures 2A, 2B:
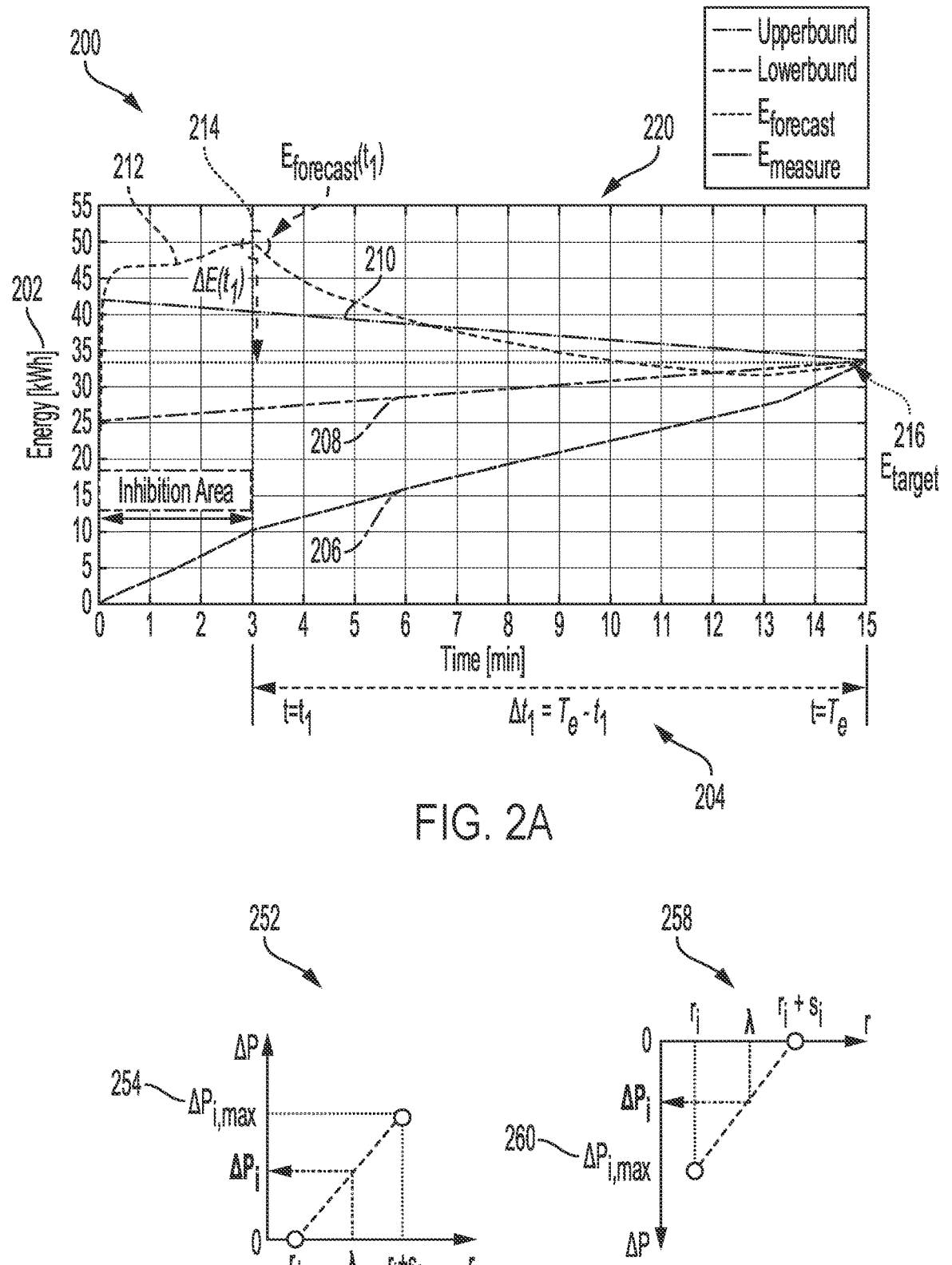
FIGS. 2A-2B are simplified graphs that depict the management of the load profile of the electric voltage network, according to one or more examples of the present disclosure.

FIGS. 2A-2B depict simplified graphs that depict the management of the load profile of the electric voltage network, according to one or more examples of the present disclosure.

FIG. 2A depicts a graph 200 that tracks the load profile of the electric network depicted by system 100. The x-axis 204 of graph 200 is time, while the y-axis 202 of graph 200 is the energy consumed by the plurality of loads 108 of system 100. In some embodiments, the time on the x-axis 204 depicts a time window in which the power consumption of the plurality of loads 108 is tracked. In some embodiments, the controller 102 may track the consumption of power of the system 100 in discrete time windows. For example, the controller 102 may track the power consumption of the system 100 in time windows of 5 minutes, 10 minutes, 15 minutes, 20 minutes, 30 minutes, or any other discrete window of time.

Line 214 represents a time value on the x-axis that demarcates the x-axis into two different parts. The first part of the x-axis is known as an inhibition time. During inhibition time, the controller 102 analyzes the power consumed by the plurality of loads 108 and generates a forecast of the power consumed by the plurality of loads 108 within a predetermined time period. Until time delineated by line 214, the controller does not compare the power consumed by the plurality of loads 108 to either the upper power consumption threshold, depicted by curve 210 or the lower power consumption threshold, depicted by curve 208. After time 214 on x-axis, the controller 102 may compare the power consumption of the system 100 to the upper and lower consumption thresholds in time windows of 5 minutes, 10 minutes, 15 minutes, 20 minutes, 30 minutes, or any other discrete window of time.

Curve 206 of graph 200 represents the actual power consumed by the plurality of loads 108 of system 100. Curve 212 of graph 200 represents a predicted consumption of power of the plurality of loads 108. In some embodiments, the sensors 112 provide measurements of the current and voltages through the plurality of loads 108 to the controller 102 periodically. For example, the sensors 112 may provide the measurements to the controller 102 every 10 seconds, every 20 seconds, every 30 seconds, every minute, etc.

As shown in FIG. 2A, the predicted consumption of power depicted by curve 212 at time 212 is greater than the upper threshold of power consumption depicted by curve 210. Upon detecting that the predicted consumption of power of the plurality of loads of system 100 is greater than the upper consumption threshold, the controller 102 may instruct switching devices 110a and 110b to begin disconnecting loads 108a and 108b to reduce the power consumption of the plurality of loads 108 based on the preset priority.

Similarly, when the controller 102 determines that the predicted consumption of power of the plurality of loads 108 is below a lower threshold, the controller 102 may instruct switching devices 110a and 110b to connect loads 108a and 108b to the electric voltage network of system 100.

The controller 102 determines whether to connect or disconnect loads 108 from the electric voltage network of system 100 based on priorities assigned to the plurality of loads 108 and the energy storage system 106. In some embodiments, the priorities of the loads 108, generators 104, and the energy storage system 106 may be assigned by an administrator of the electric voltage network depicted by system 100 when the electric voltage network is setup. The priority values associated with the plurality of loads 108 and the generators 104 are fixed and cannot be changed when the system is in operation. In case the controller 102 determines that the predicted power consumption of the plurality of loads 108 within a specific time window is greater than an upper threshold, the controller 102 may instruct switching devices 110a or 110b to disconnect low priority loads from the plurality of loads 108 from the system 100. On the other hand, in case the controller 102 determines that the predicted power consumption of the plurality of loads within the specific time window is lower than the lower threshold, the controller 102 may configure switching devices 110*a* and 110*b* to connect loads in order of priority assigned to them FIG. 2B includes graphical representations of an exemplary load of the plurality loads of electric voltage network, in accordance with embodiments of the present disclosure. Graphs 252 and 258 of FIG. 2B are exemplary curves for a generator of generators 104 depicted in FIG. 1. Graphs 252 and 258 plot a change in power ΔP on the y-axis (e.g., 254 and 260), and priority of connection (r) on the x-axis (e.g., 256 and 262). The curves of graphs 252 and 258 range from the generator's minimum set point (0) to its maximum, which correspond (either respectively or in reverse) with its fixed priority setting and its priority setting plus its steps parameter, which sets the curve's slope. In some examples, $r_i$ as shown in FIG. 2B is a priority value at which an i-th device (such as a generator or load, etc.) should be connected to the electric voltage network. In some embodiments, $r_i$ may be defined by the user based on the configurations of the electric voltage network. In some examples, $s_i$ is a length of the interval wherein the i-th device participates in the regulation. In such embodiments, lambda (λ) is the priority level calculated by the controller 102 at time 't' depicted on the x-axis.

In some embodiments, the quantity $r_i+s_i$ defines a maximum priority level of the system at which a device may be included as part of the electric voltage network depicted by system 100.

In some examples, there may be a difference between the priority of each device (loads, generators and storage systems) and the priority evaluated by the proposed controller, which is indicated with λ (lambda). In such cases, when controller 102 determines that $λ≥r_i+s_i$, then the controller 102 infers that the i-th device (whether a load 108 or a generator 104) has provided the maximum contribution available.

Additionally, the controller 102 may also determine each generator's availability. In some embodiments, resources may be configured with timing requirements, e.g. minimum on time, minimum off time, etc., which can change the availability. For example, availability of a generator may be determined by the curves depicted in graphs 254 and 258 of FIG. 2B. In some cases, the availability of a generator may be determined based on the value of ΔPi, max in graphs 254 and 258, which is evaluated by field measurements and technical limits of the specific device (e.g. loads, generators and storage systems).

Based on the availabilities and curves of the generators 104, the controller 102 may execute a "lambda iteration method" that searches for and converges on a priority level, λ associated with the relevant generator. Finally, the updated λ value (i.e., the updated system priority) can be applied to each resource curve to find its new set point.

By repeating this process periodically, the controller 102 is able to steer the energy usage towards the target. The overall effect is that the controller 102 is able to manage energy usage of the system 100 at a desired level. The performance of lambda iteration as depicted in FIG. 2B is described in more detail in U.S. Patent Application Publication Number 2015/0028671, corresponding to U.S. patent application Ser. No. 14/384,309, which is hereby incorporated by reference in its entirety.

Figure 3A:
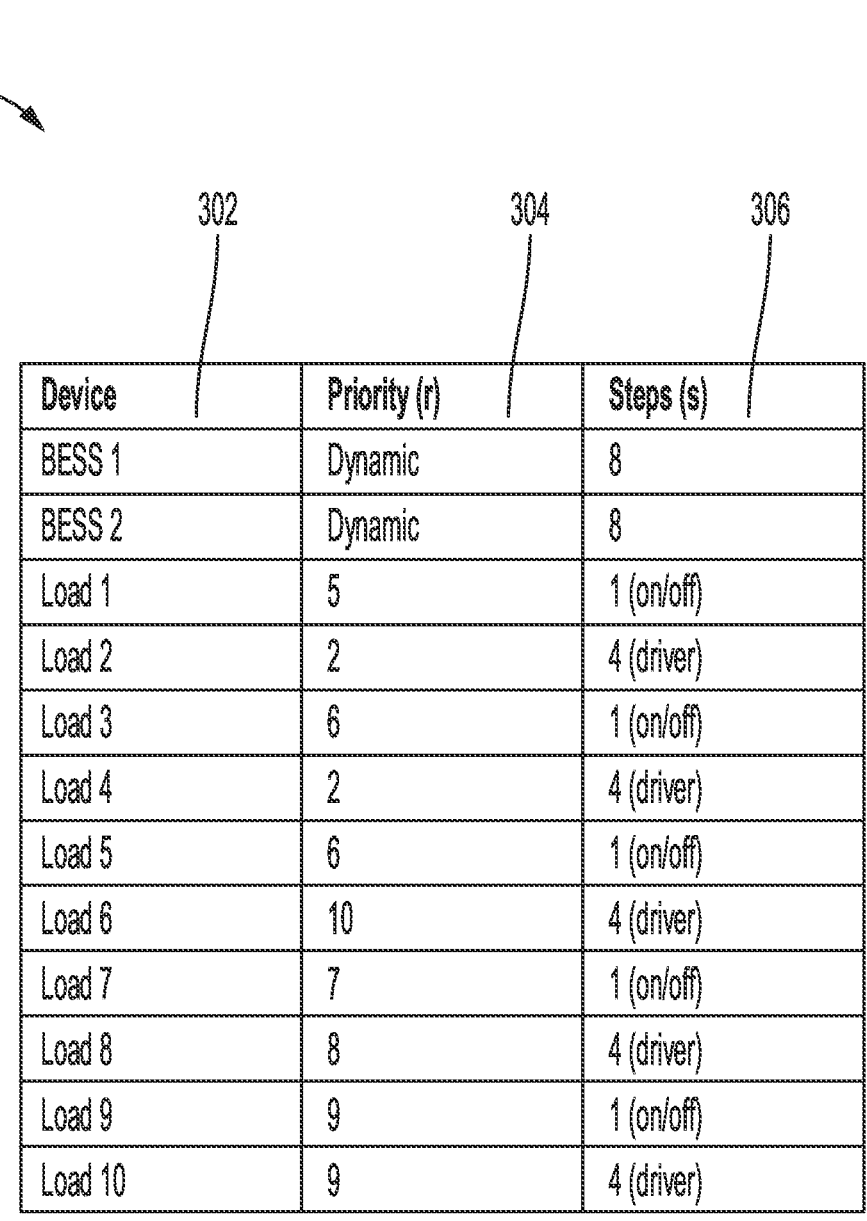

FIGS. 3A-3B depict different tables that are used for managing the load profile of the electric voltage network, according to one or more examples of the present disclosure, according to one or more examples of the present disclosure.

FIG. 3A is a table that includes a plurality of loads 108 and two energy storage systems 106. Each load of the plurality of loads 108, shown in column 302, that is assigned a priority, which is a number from 1-10, in column 304. The table of FIG. 3A also includes a third column 306 that indicates a number of steps needed to turn on or turn off the elements listed in the table (e.g., the plurality of loads 108 and the energy storage systems 106 (shown as BESS in the table). The priorities assigned to each load of the plurality of loads 108 are a fixed number between 1 and 10. The higher the numerical value of the priority, the higher the priority of respective load. For example, as shown in FIG. 3A, load 6 has a priority of 10, and load 5 has a priority of 6 and load 7 has a priority of 7. Thus, load 7 has a higher priority than load 5, and load 6 has higher priority than load 7. In such cases, if the controller 102 is trying to reduce the power consumption of the system 100, the controller 102, in response to reviewing the power consumption of the system 100, the controller 102 may select a base priority, such as 7. In such cases, the controller 102 may instruct switching devices 110*a* and 110*b* to disconnect loads from the plurality of loads 108 that have a priority of 6 or lower. In this case, in order to reduce the consumption of power of the system 100, the controller 102 may disconnect loads 1-5 as shown in table 300 of FIG. 3A.

Table 300 of FIG. 3A also includes two entries for energy storage systems 106 (e.g., BESS 1 and BESS 2). However, there are no fixed priorities provided to the energy storage systems 106. The priorities assigned to the energy storage systems 106 are dynamic because they are based on the state of charge of the energy storage system 106.

An administrator of the system 100 may assign various different priorities to the energy storage system 106 based on the state of charge. The priorities may be assigned dynamically by controller 102 or may be preset by the administrator of the system 100. FIG. 3B shows an exemplary breakdown of the state of charge of the energy storage systems BESS and a respective priority assigned to the each state of charge.

Table 350, shown in FIG. 3B depicts different columns 352-360. Column 352 depicts a state of charge of the energy storage system 106. The state of charge is broken down in 10% windows, for example, column 352 depicts that the state of charge of the energy storage system 106 may be divided into ranges of 0-10%, 10-20%, 20-30%, etc. At the commissioning phase, the controller 102 may assign different priority levels to these ranges as if they were individual resources. The controller 102, in response to receiving the state of charge values received from the energy storage systems, may assign a priority to the energy storage systems based on the table shown in FIG. 3B. The controller 102 may also update the priority assigned when the controller 102 determines a change in state of charge of the energy storage system using the table 350 of FIG. 3B.

Columns 354-360 of table 350 of FIG. 3B depict priorities assigned to two different energy storage systems 106 (e.g., BESS 1 and BESS 2 also shown in FIG. 3A). Columns 354 and 358 depict priorities for discharging and charging energy storage system BESS 1. Columns 356 and 360 depict priorities for discharging and charging energy storage system BESS 2. In some embodiments, the controller 102 may be configured to determine whether the energy storage systems 106 may be used for charging or discharging, based on the state of charge of the energy storage system 106. Upon making the decision to either charge or discharge the energy storage system, controller 102 may access a specific priority list for the energy storage system based on the state of charge.

Table 350 of FIG. 3B depicts the exemplary embodiment where a single priority level is assigned to the energy storage systems 106 based on their state of charge for both charging and discharging configurations. As shown in columns 354, 356, 358, and 360 of table 350, FIG. 3B shows that for a low state of charge (e.g., 0-20%), a high priority (e.g., 10) may be assigned to BESS 1 and BESS 2. Further, in a medium state of charge, the priority of the BESS 1 and BESS 2 may be reduced to priority level 8 (for a state of charge of 20-30%), priority level 6 (for a state of charge of 30-40%), priority level 4 (for a state of charge of 40-50%), and priority level 2 (for a state of charge of 50-60%). Finally, after BESS 1 and BESS 2 are charged to more than 60% each, the first energy storage system BESS 1 is assigned a priority 1 while the second energy storage system BESS 2 is assigned a priority 2. When the priority assigned to the energy storage systems BESS 1 and BESS 2 is high, the controller 102 will treat the energy storage systems BESS 1 and BESS 2 as loads in the plurality of loads 108. In such embodiments, the controller 102 may instruct switching devices to connect the energy storage systems BESS 1 and BESS 2 and charge them in order to increase the power consumption of the plurality of loads 108 of system 100. As the state of charge of the energy storage systems BESS 1 and BESS 2 increases, their priority decreases as shown in columns 358 and 360 of table 350 of FIG. 3B. This indicates that as the charge on the energy storage systems increase, the controller 102 is less likely to prioritize using the energy storage systems as loads in the plurality of loads 108, as the energy storage systems will need less and less charging. Once the energy storage systems are past 60% charge, they are both assigned the lowest possible priorities so that makes them the least likely to be used as loads, if the controller 102 determines that the power consumption of system 100 needs to be increased.

In this exemplary embodiment, the priority values assigned to the energy storage systems 106 for discharging depicted in columns 354 and 356 are also as the priority level assigned to the energy storage systems 106 for charging, depicted in columns 358 and 360. As the charging and discharging are both on the same scale, a low charging priority may correspond to a high discharging priority. For example, as described above, as the state of charge of the energy storage systems BESS 1 and BESS 2 increases, they are both assigned a lower charging priority as the controller 102 is less likely to instruct the switching devices to connect the energy storage systems as loads to the network. However, a low charging priority may correspond to a high discharging priority. Therefore, a discharging priority of 1 may be the highest discharging priority, and the discharging priority of 10 may be the lowest discharging priority. Columns 354 and 356 of FIG. 3B indicate a breakdown of discharging priority based on the state of charge of the energy storage systems. As the state of charge increases, the energy storage systems are assigned a high discharging priority.

When the energy storage systems are assigned a high discharging priority, the controller 102 may classify the energy storage systems as generators 106, and may be configured to use the energy storage systems to reduce to power drawn by the system 100 from the electric grid. As shown in columns 354 and 356, if the energy storage system is more than 60% charge, the controller 102 may treat the energy storage system as the highest priority generator and use it in case the power consumption of the system 100 increases past the upper threshold of consumption.

This approach allows the controller 102 to maintain the energy storage systems in a healthy range of charge without reaching the extremes.

The controller 102 may be configured to calculate the state of charge of the energy storage systems periodically. In some embodiments, the controller 102 may be configured to calculate the state of charge of the energy storage systems after discrete time periods of every 10 seconds, 30 seconds, 1 minute, and so on. Upon determining the state of charge of the energy storage systems, the controller 102 may dynamically reassign the priorities to the energy storage systems, in order to make sure that the energy storage systems are not overcharged or overdrawn.

Figure 4:
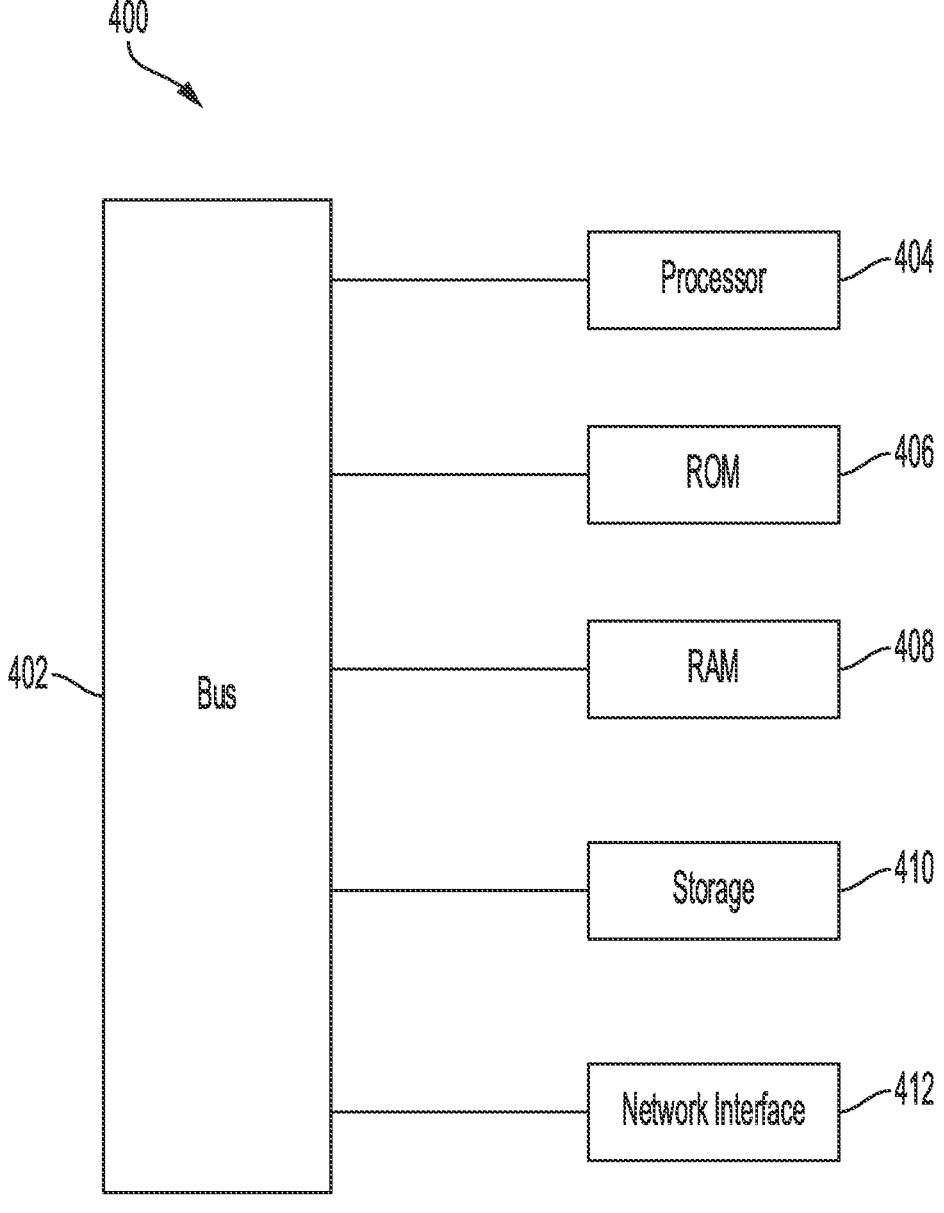
FIG. 4 is a simplified block diagram of one or more devices or systems within the exemplary environment of FIG. 1.

FIG. 4 is a block diagram of an exemplary system or device 400 within the system 100 such as the controller 102. The system 400 includes a processor 404, such as a central processing unit (CPU), and/or logic, that executes computer executable instructions for performing the functions, processes, and/or methods described herein. In some examples, the computer executable instructions are locally stored and accessed from a non-transitory computer readable medium, such as storage 410, which may be a hard drive or flash drive. Read Only Memory (ROM) 406 includes computer executable instructions for initializing the processor 404, while the random-access memory (RAM) 408 is the main memory for loading and processing instructions executed by the processor 404. The network interface 412 may connect to a wired network or cellular network and to a local area network or wide area network. The system 400 may also include a bus 402 that connects the processor 404, ROM 406, RAM 408, storage 410, and/or the network interface 412. The components within the system 400 may use the bus 402 to communicate with each other. The components within the system 400 are merely exemplary and might not be inclusive of every component within the controller 102. Additionally, and/or alternatively, the system 400 may further include components that might not be included within every entity of system 100. For instance, in some examples, the controller 102 might not include a network interface 412.

FIG. 5 illustrates an exemplary process for training a machine learning model to detect winding voltage imbalance in a poly-phase motor, according to one or more examples of the present disclosure. The process 500 may be performed by the controller 102 of system 100 shown in FIG. 1. However, it will be recognized that any of the following blocks may be performed in any suitable order and that the process 500 may be performed in any environment and by any suitable computing device and/or controller.

At block 502, the controller 102 determines a predicted energy usage of the electric network at an end of a time period. For example, the predicted energy usage of the electric network may be determined based on analyzing the power consumption of the plurality of loads 108 in a first portion of a predetermined time period. The prediction of the energy usage may be based on the measurements of current and voltage associated with each of the plurality of loads 108 from the sensors associated with the plurality of loads.

At block 504, the controller 102 determines an adjustment of the plurality of loads based on the respective priority of each respective load, based on comparing the predicted energy usage to a target energy usage. For example, the controller 102 may compare the predicted power usage of the plurality of loads 108 with an upper consumption threshold and a lower consumption threshold. If the predicted power consumption is above the upper consumption threshold, the controller 102 may instruct switching devices 110a and 110b to disconnect some of the loads 108 from the network based on priorities assigned to the loads. Similarly, if the predicted power consumption is below the lower consumption threshold, the controller 102 may instruct switching devices 110a and 110b to connect some of the loads 108 to the network based on priorities assigned to the loads.

At block 506, the controller 102 dynamically assigns a priority to the energy storage system based on the determined adjustment of the plurality of loads and a determined state of charge of the energy storage system. For example, a the energy storage system 106 may be assigned a priority based on the state of charge of the energy storage system 106. This is described in more detail with respect to FIGS. 3A and 3B.

At block 508, the controller 102 performs the adjustment of the plurality of loads and the energy storage system of the electric network using the respective priority of each respective load and the dynamically assigned priority of the energy storage system. Using the priorities assigned to the energy storage system 106 and the plurality of loads 108, the controller 102 may regulate the power consumption of the system 100 by instructing switching devices to connect or disconnect loads or the energy storage system from the system 100.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for managing the load profile of a low to medium voltage electric network, the system comprising:
   a plurality of loads electrically coupled to the electric network, wherein each respective load of the plurality of loads is assigned a respective priority;
   an energy storage system electrically coupled to the electric network; and
   a controller configured to:
      determine a predicted energy usage of the electric network at an end of a time period;
      based on comparing the predicted energy usage to a target energy usage, determine an adjustment of the plurality of loads based on the respective priority of each respective load;

based on the determined adjustment of the plurality of loads and a determined state of charge of the energy storage system, dynamically assign a priority to the energy storage system;
      perform the adjustment of the plurality of loads and the energy storage system of the electric network using the respective priority of each respective load and the dynamically assigned priority of the energy storage system; and
      wherein performing the adjustment of the plurality of loads comprises:
      based on determining that the predicted energy usage is greater than the target energy usage within the time period, identifying a threshold priority level; and
      determining a subset of loads from the plurality of loads, wherein the respective priority associated with each respective load of the subset of loads is less than the threshold priority level; and
      causing each respective switching device associated with each respective load of the subset of loads to electrically decouple the respective load of the subset of loads from the electric network.

2. The system of claim 1, wherein dynamically assigning the priority to the energy storage system comprises:
   based on determining that the state of charge of the energy storage system is greater than a discharge threshold, assigning a first priority to the energy storage system.

3. The system of claim 2, wherein dynamically assigning the priority to the energy storage system further comprises:
   based on determining that the state of charge of the energy storage system is lower than a charge threshold, assigning a second priority to the energy storage system.

4. The system of claim 3, wherein the first priority is lower than the second priority.

5. The system of claim 2, wherein the performing adjustment of the energy storage system comprises:
   causing the energy storage system to provide power to the electric network based on the assigned first priority.

6. The system of claim 3, wherein performing the adjustment of the energy storage system comprises:
   causing the energy storage system to receive power from the electric network based on the assigned second priority.

7. The system of claim 1, wherein the predicted energy usage is determined periodically within the time period.

8. The system of claim 1, wherein the time period is a length of fifteen minutes.

9. A system for managing the load profile of a low to medium voltage electric network, the system comprising:
   a plurality of loads electrically coupled to the electric network, wherein each respective load of the plurality of loads is assigned a respective priority;
   an energy storage system electrically coupled to the electric network; and
   a controller configured to:
      determine a predicted energy usage of the electric network at an end of a time period;
      based on comparing the predicted energy usage to a target energy usage, determine an adjustment of the plurality of loads based on the respective priority of each respective load;
      based on the determined adjustment of the plurality of loads and a determined state of charge of the energy storage system, dynamically assign a priority to the energy storage system;
      perform the adjustment of the plurality of loads and the energy storage system of the electric network using the respective priority of each respective load and the dynamically assigned priority of the energy storage system; and wherein performing the adjustment of the plurality of loads comprises:

based on determining that the predicted energy usage is less than the target energy usage within the time period, identifying a threshold priority level; and determining a subset of loads from the plurality of loads, wherein the respective priority associated with each respective load in the subset of loads is greater than the threshold priority level; and causing each respective switching device associated with each respective load of the subset of loads to electrically couple the respective load of the subset of loads to the electric network.

10. A method for executing a transfer from a first power source to a second power source, the method comprising:

determining a predicted energy usage of the electric network at an end of a time period, wherein the electric network comprises a plurality of loads electrically coupled to the electric network, and wherein each respective load of the plurality of loads is assigned a respective priority;

based on comparing the predicted energy usage to a target energy usage, determining an adjustment of the plurality of loads based on the respective priority of each respective load;

based on the determined adjustment of the plurality of loads and a determined state of charge of an energy storage system electrically coupled to the electric network, dynamically assigning a priority to the energy storage system;

performing the adjustment of the plurality of loads and the energy storage system of the electric network using the respective priority of each respective load and the dynamically assigned priority of the energy storage system; and wherein performing the adjustment of the plurality of loads comprises:

based on determining that the predicted energy usage is greater than the target energy usage within the time period, identifying a threshold priority level;

determining a subset of loads from the plurality of loads, wherein the respective priority associated with each respective load of the subset of loads is less than the threshold priority level; and causing each respective switching device associated with each respective load of the subset of loads to electrically decouple the respective load of the subset of loads from the electric network.

11. The method of claim 10, wherein dynamically assigning the priority to the energy storage system comprises:

based on determining that the state of charge of the energy storage system is greater than a discharge threshold, assigning a first priority to the energy storage system.

12. The method of claim 11, wherein dynamically assigning the priority to the energy storage system further comprises:

based on determining that the state of charge of the energy storage system is lower than a charge threshold, assigning a second priority to the energy storage system.

13. The method of claim 12, wherein the first priority is lower than the second priority.

14. The method of claim 11, wherein the performing adjustment of the energy storage system comprises:

causing the energy storage system to provide power to the electric network based on the assigned first priority.

15. The method of claim 12, wherein performing the adjustment of the energy storage system comprises:

causing the energy storage system to receive power from the electric network based on the assigned second priority.

16. The method of claim 10, wherein the predicted energy usage is determined periodically within the time period.

17. The method of claim 10, wherein the time period is a length of fifteen minutes.

18. A method for executing a transfer from a first power source to a second power source, the method comprising:

determining a predicted energy usage of the electric network at an end of a time period, wherein the electric network comprises a plurality of loads electrically coupled to the electric network, and wherein each respective load of the plurality of loads is assigned a respective priority;

based on comparing the predicted energy usage to a target energy usage, determining an adjustment of the plurality of loads based on the respective priority of each respective load;

based on the determined adjustment of the plurality of loads and a determined state of charge of an energy storage system electrically coupled to the electric network, dynamically assigning a priority to the energy storage system; and performing the adjustment of the plurality of loads and the energy storage system of the electric network using the respective priority of each respective load and the dynamically assigned priority of the energy storage system; and wherein performing the adjustment of the plurality of loads comprises:

based on determining that the predicted energy usage is less than the target energy usage within the time period, identifying a threshold priority level; and determining a subset of loads from the plurality of loads, wherein the respective priority associated with each respective load in the subset of loads is greater than the threshold priority level; and causing each respective switching device associated with each respective load of the subset of loads to electrically couple the respective load of the subset of loads to the electric network.

* * * * *